US011820207B2

(12) United States Patent
Mauro

(10) Patent No.: US 11,820,207 B2
(45) Date of Patent: Nov. 21, 2023

(54) SLIDING GOLF CART WINDSHIELD ASSEMBLY

(71) Applicant: Edward Mauro, Oldsmar, FL (US)

(72) Inventor: Edward Mauro, Oldsmar, FL (US)

( * ) Notice: Subject to any disclaimer, the term of this patent is extended or adjusted under 35 U.S.C. 154(b) by 0 days.

(21) Appl. No.: 17/522,086

(22) Filed: Nov. 9, 2021

(65) Prior Publication Data

US 2022/0126651 A1    Apr. 28, 2022

Related U.S. Application Data

(63) Continuation-in-part of application No. 16/453,540, filed on Jun. 26, 2019, now Pat. No. 11,167,623.

(60) Provisional application No. 62/689,976, filed on Jun. 26, 2018.

(51) Int. Cl.
*E05F 15/643* (2015.01)
*B60J 1/06* (2006.01)
*E05D 13/00* (2006.01)
*E05D 15/16* (2006.01)

(52) U.S. Cl.
CPC ............ *B60J 1/06* (2013.01); *E05D 13/1207* (2013.01); *E05D 15/165* (2013.01); *B60Y 2200/86* (2013.01); *E05Y 2201/654* (2013.01); *E05Y 2900/55* (2013.01)

(58) Field of Classification Search
CPC ...... B60J 1/06; E05D 13/1207; E05D 15/165; B60Y 2200/86; E05Y 2201/654; E05Y 2900/50; E05Y 2900/55
USPC .......................................................... 49/360
See application file for complete search history.

(56) References Cited

U.S. PATENT DOCUMENTS

| 2,555,710 | A | * | 6/1951 | Simpkins | ................ E05F 11/48 |
| | | | | | 49/425 |
| 2,555,859 | A | * | 6/1951 | Rappl | ................... E05F 11/488 |
| | | | | | 49/352 |
| 4,072,338 | A | * | 2/1978 | Lawrence | .................. B60J 1/06 |
| | | | | | 296/146.16 |
| 4,773,695 | A | | 9/1988 | Jones et al. | |
| 4,792,175 | A | | 12/1988 | Gerber | |
| 4,819,979 | A | | 4/1989 | Moglia | |
| 5,144,770 | A | * | 9/1992 | Kraus | ..................... E05F 11/40 |
| | | | | | 49/362 |

(Continued)

FOREIGN PATENT DOCUMENTS

| CN | 206125262 U | * | 4/2017 |
| CN | 211519200 U | * | 9/2020 |

(Continued)

*Primary Examiner* — Jerry E Redman
(74) *Attorney, Agent, or Firm* — ALLEN, DYER ET AL.

(57) ABSTRACT

A sliding golf cart windshield assembly includes a first elongated rail, a second elongated rail spaced apart from the first elongated rail, and an upper windshield pane having a first longitudinal edge and an opposing second longitudinal edge. The upper windshield pane is slidably positioned between the first and second elongated rails. The assembly also includes a lower drive pulley, an upper drive pulley, and a drive belt stretched between the lower drive pulley and the upper drive pulley. In addition, the assembly includes a drive panel slidingly engaged with the second rail and secured to the upper window pane and the drive belt, and a motor coupled to the lower drive pulley and configured to rotate the lower drive pulley to raise and lower the upper windshield pane.

10 Claims, 7 Drawing Sheets

(56) References Cited

U.S. PATENT DOCUMENTS

| | | | |
|---|---|---|---|
| 5,192,109 A | 3/1993 | Roberts | |
| 5,195,797 A | 3/1993 | Hobbs | |
| 5,385,379 A | 1/1995 | Heavner | |
| 5,385,380 A | 1/1995 | Heavner | |
| 5,440,837 A * | 8/1995 | Piltingsrud | E05D 15/22 |
| | | | 74/625 |
| 5,568,953 A | 10/1996 | Showalter | |
| 5,975,615 A | 11/1999 | Showalter | |
| 6,115,966 A * | 9/2000 | Shibata | E05F 15/689 |
| | | | 49/374 |
| 6,158,801 A | 12/2000 | Tucker | |
| 6,206,447 B1 | 3/2001 | Nation | |
| 6,216,714 B1 | 4/2001 | Tucker | |
| 6,302,440 B1 | 10/2001 | Goodstein | |
| RE38,272 E | 10/2003 | Nation | |
| 6,658,793 B2 * | 12/2003 | Perron | E06B 9/04 |
| | | | 49/63 |
| 6,663,158 B1 | 12/2003 | Showalter | |
| 7,311,347 B1 | 12/2007 | Aller | |
| 7,677,961 B2 * | 3/2010 | DeCastro | E05F 15/681 |
| | | | 454/56 |
| 8,087,711 B1 | 1/2012 | Mauro | B60J 1/06 |
| | | | 296/89 |
| 8,572,895 B2 * | 11/2013 | Kollar | G02B 23/16 |
| | | | 348/148 |
| 8,671,622 B2 * | 3/2014 | Thomas | E06B 9/04 |
| | | | 49/31 |
| 9,038,317 B2 | 5/2015 | Hansen | |
| 9,475,363 B2 | 10/2016 | Mauro | |
| 9,797,182 B2 | 10/2017 | Raap et al. | |
| 10,344,521 B2 * | 7/2019 | Ben-Arie | E05F 11/485 |
| 11,167,623 B2 * | 11/2021 | Mauro | E05D 13/12 |
| 11,225,830 B2 * | 1/2022 | Liu | E05D 13/12 |
| 2005/0093331 A1 | 5/2005 | Moskos et al. | |
| 2005/0229494 A1 | 10/2005 | Harari et al. | |
| 2006/0091089 A1 | 5/2006 | Christiansen et al. | |
| 2006/0113817 A1 | 6/2006 | Gasper | |
| 2008/0265611 A1 | 10/2008 | Flynn | |
| 2009/0230714 A1 | 9/2009 | Reese | |
| 2009/0278373 A1 | 11/2009 | Rouzer et al. | |
| 2010/0060027 A1 | 3/2010 | Marsh et al. | |
| 2011/0001331 A1 | 1/2011 | Hirneise | |
| 2011/0260019 A1 | 10/2011 | Held | |
| 2012/0098290 A1 | 4/2012 | Miller | |
| 2012/0199294 A1 | 8/2012 | Fayette et al. | |
| 2013/0062905 A1 | 3/2013 | Hield | |
| 2014/0203588 A1 | 7/2014 | Tyrer | |
| 2015/0043051 A1 * | 2/2015 | Woodrow | G02F 1/0126 |
| | | | 359/275 |
| 2015/0102630 A1 | 4/2015 | Guzzetta | |
| 2017/0254134 A1 * | 9/2017 | Ben-Arie | E05F 15/665 |
| 2019/0299754 A1 * | 10/2019 | Woodrow | G02F 1/153 |
| 2019/0389280 A1 * | 12/2019 | Mauro | B60J 1/06 |
| 2021/0078389 A1 * | 3/2021 | Nakaji | B60J 1/06 |
| 2021/0252951 A1 * | 8/2021 | Harvey | B60J 1/06 |
| 2022/0126651 A1 * | 4/2022 | Mauro | B60J 1/06 |

FOREIGN PATENT DOCUMENTS

| | | | | |
|---|---|---|---|---|
| CN | 113829856 A | * | 12/2021 | |
| GB | 2203413 A | * | 10/1988 | B65H 3/042 |
| JP | 2003154844 A | * | 5/2003 | |
| JP | 3208094 U | * | 12/2016 | |
| WO | WO-2009110273 A1 | * | 9/2009 | B60J 1/06 |

\* cited by examiner

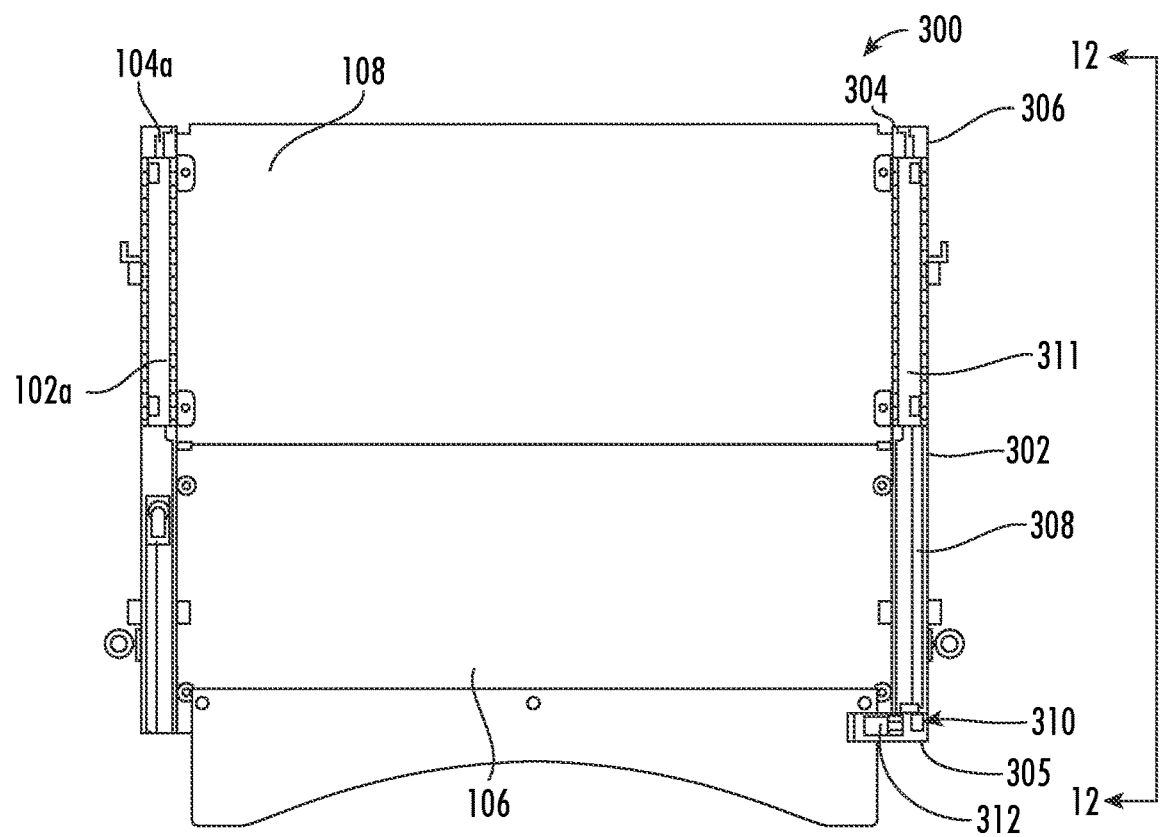
FIG. 9
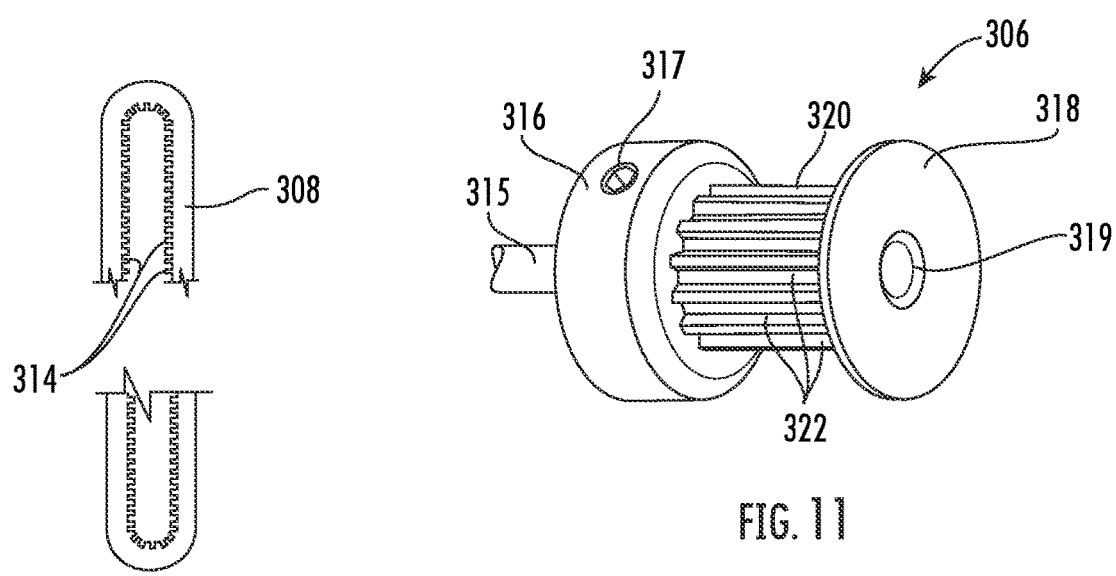
FIG. 10
FIG. 11

SLIDING GOLF CART WINDSHIELD ASSEMBLY

CROSS-REFERENCE TO RELATED APPLICATIONS

This application is a continuation-in-part of U.S. application Ser. No. 16/453,540 filed Jun. 26, 2019, now U.S. Pat. No. 11,167,623 issued Nov. 9, 2021, which claims priority to U.S. Provisional Application Ser. No. 62/689,976 filed on Jun. 26, 2018, and the contents of which are herein incorporated by reference in their entirety.

TECHNICAL FIELD

The present invention relates to the field of golf carts, and, more particularly, to a sliding golf cart windshield assembly.

BACKGROUND

Golf carts are motorized vehicles that are most often used by golfers when playing a round of golf. Although golf is generally played in favorable weather conditions, there are instances when additional protection from cold weather, wind or rain is needed to the occupants of the golf cart. The additional protection may be provided using a windshield on the front of the golf cart.

Prior art windshields for golf carts have included two panels where the top panel is adapted to open by folding down over the lower panel to provide an open area at the front of the golf cart. However, a shortcoming of the prior art golf cart windshields is the inability to easily and effectively secure the upper panel when in an open position and folded down over the lower panel. Most windshields cannot be opened or closed from inside the golf cart. You must exit the car to open or close the windshield. Current windshields use rubber clips that over time get hard and crack rendering them inoperable. Current windshields typically have a PVC hinge connecting the top and the bottom. These hinges by nature turn yellow obstructing the view from the golf cart.

Other prior art windshields are designed to be completely removed from the golf cart or are required to be stored on the roof portion of the golf cart. Thereby, making such prior art windshields inconvenient and cumbersome to maneuver. None of the prior art golf cart windshields can be adjusted to provide an opening of variable height or to accommodate various widths and configurations of vertical supports that are used to secure the windshield to the golf cart.

SUMMARY

In view of the foregoing background, it is therefore an object of the present invention to provide an improved golf cart windshield assembly. In a particular aspect, the assembly includes a first elongated rail having a top end and a bottom end, a second elongated rail spaced apart from the first elongated rail and having a top end and a bottom end, and an upper windshield pane having a first longitudinal edge and an opposing second longitudinal edge. The upper windshield pane is slidably positioned between the first and second elongated rails. The assembly also includes a lower drive pulley positioned proximate the bottom end of the second rail, an upper drive pulley positioned proximate the top end of the second rail, and a drive belt stretched between the lower drive pulley and the upper drive pulley. In addition, the assembly includes a drive panel slidingly engaged with the second rail and secured to the upper window pane and the drive belt, and a motor coupled to the lower drive pulley and configured to rotate the lower drive pulley to raise and lower the upper windshield pane. The sliding golf cart windshield assembly includes a lower windshield pane fixed between the first and second elongated rails.

The drive belt includes a plurality of drive belt teeth, and the lower drive pulley comprises a plurality of drive pulley teeth configured to engage the plurality of drive belt teeth. The drive belt may comprise a flexible material. The motor includes a shaft that rotates, and the drive pulley comprises a center aperture for receiving the shaft of the motor, and a locking screw configured to be secure the shaft of the motor to the drive pulley.

In addition, the assembly may include a first speaker mounted to the first rail, where the at least one speaker is wirelessly connected to a music source. The sliding golf cart windshield assembly is configured to be secured to vertical support members of a golf cart.

In another particular aspect, a sliding golf cart windshield assembly includes a first elongated rail having a top end and a bottom end, and a second elongated rail spaced apart from the first elongated rail and having a top end and a bottom end. An upper windshield pane has a first longitudinal edge and an opposing second longitudinal edge, and positioned between the first and second elongated rails. In addition, the assembly includes a first upper plate secured to the first longitudinal edge of the upper windshield pane and being slidable within the first elongated rail. A first lower hub is coupled to the bottom end of the first elongated rail. The assembly also includes a first belt having a first end and a second end, where the first end is fixed to the top end of the first elongated rail and the first belt passes around the first lower hub to the second end being fixed to the first upper plate. The assembly includes a lower drive pulley positioned proximate the bottom end of the second rail, an upper drive pulley positioned proximate the top end of the second rail, a drive belt stretched between the lower drive pulley and the upper drive pulley, and a drive panel slidingly engaged with the second rail and secured to the upper window pane and the drive belt. A motor is coupled to the lower drive pulley and configured to rotate the lower drive pulley to raise and lower the upper windshield pane.

The assembly may also include a first resilient member having a bottom end and a top end, where the bottom end is secured to the bottom end of the first elongated rail and the top end is secured to the first lower hub. A lower windshield pane may be fixed between the first and second elongated rails. The first resilient member is configured to counterbalance the upper windshield pane.

In yet another aspect, a sliding golf cart windshield assembly includes a first elongated rail having a top end and a bottom end, and a second elongated rail spaced apart from the first elongated rail and having a top end and a bottom end. The assembly includes an upper windshield pane having a first longitudinal edge and an opposing second longitudinal edge, where the upper windshield pane is positioned between the first and second elongated rails. The assembly also includes a lower windshield pane positioned between the first and second elongated rails, where the upper windshield pane is coupled to a reciprocating lifting device. In addition, a motor is coupled to the upper windshield pane and configured to slide the upper windshield pane up and down.

The assembly may include a belt having a first end and a second end, where the first end is fixed to the top end of the first elongated rail and the second end is coupled to the resilient member. The resilient member may comprise a spring and be configured to counterbalance the upper windshield pane.

In addition, the assembly may include a lower drive pulley positioned proximate the bottom end of the second rail, an upper drive pulley positioned proximate the top end of the second rail, and a drive belt stretched between the lower drive pulley and the upper drive pulley. A drive panel may be slidingly engaged with the second rail and secured to the upper window pane and the drive belt.

BRIEF DESCRIPTION OF THE DRAWINGS

FIG. 9 is a front view of a sliding golf cart windshield assembly having a motor in accordance with another particular aspect of the invention;

FIG. 10 is a detail view of a drive belt of the sliding golf cart windshield assembly of FIG. 9;

FIG. 11 is a detail view of a drive pulley of the sliding golf cart windshield assembly of FIG. 9;

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
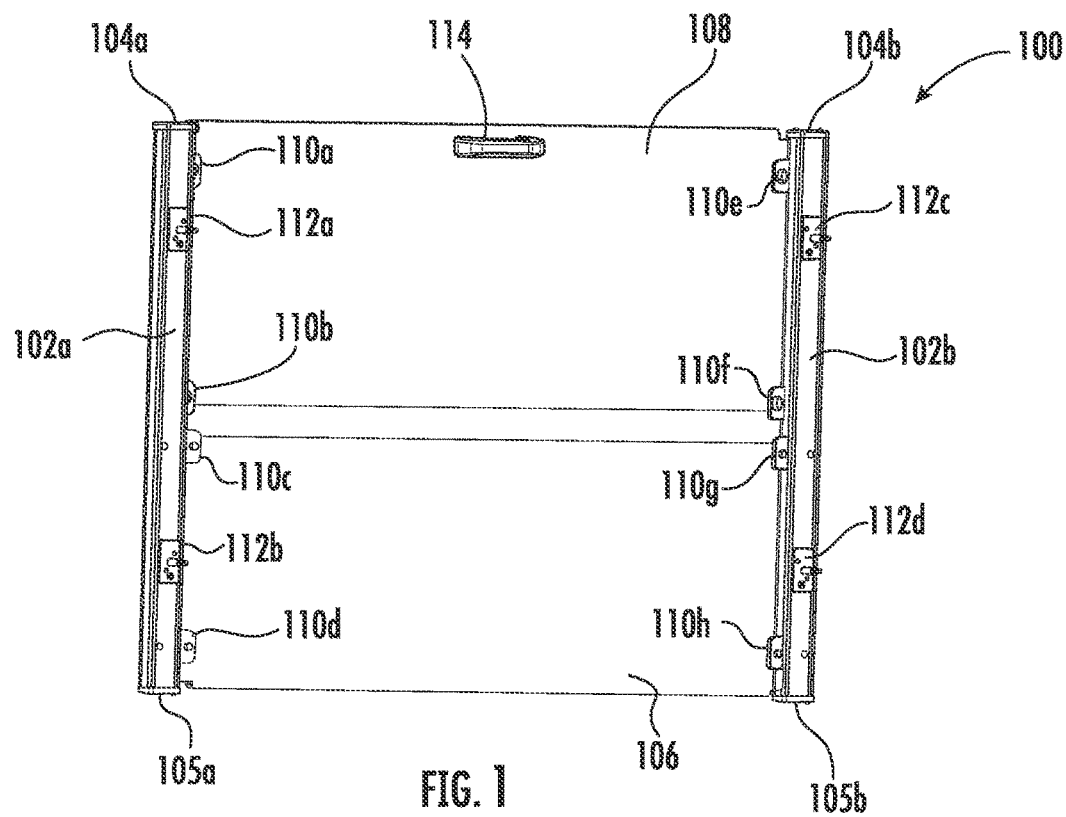
FIG. 1 is a front view of a sliding golf cart windshield assembly in accordance with a particular aspect of the invention.
Figure 2:
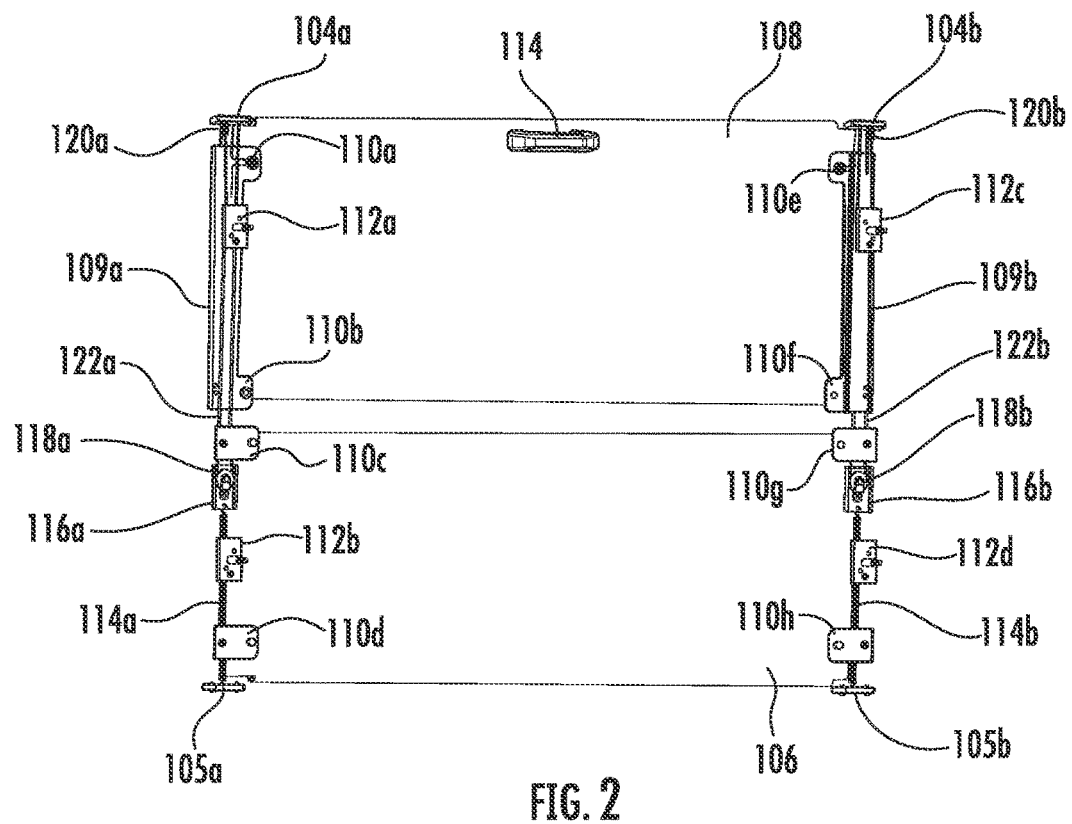
FIG. 2 is a front view of the sliding golf cart windshield assembly of FIG. 1 without the elongated rails.

Referring to FIGS. 1 and 2, a particular aspect of a sliding golf cart windshield assembly is disclosed and generally designated 100. As shown in FIG. 1, the windshield assembly 100 includes a first elongated rail 102a having a top end 104a and a bottom end 105a and a second elongated rail 102b spaced apart from the first elongated rail 102a. The second elongated rail 102b also has a top end 104b and a bottom end 105b. A lower windshield pane 106 and an upper windshield pane 108 are positioned between the pair of elongated rails 102a, 102b.

The upper windshield pane 108 has a first longitudinal edge and an opposing second longitudinal edge. A first upper plate 109a is secured to the first longitudinal edge of the upper windshield pane 108 by flanges 110a, 110b as shown in FIG. 2 where the first and second elongated rails have been removed for clarity. The first upper plate 109a is slidable within the first elongated rail. Similarly, a second upper plate 109b is secured to the second longitudinal edge of the upper windshield pane 108 by flanges 110e, 110f and is slidable within the second elongated rail 102a.

Figure 3:
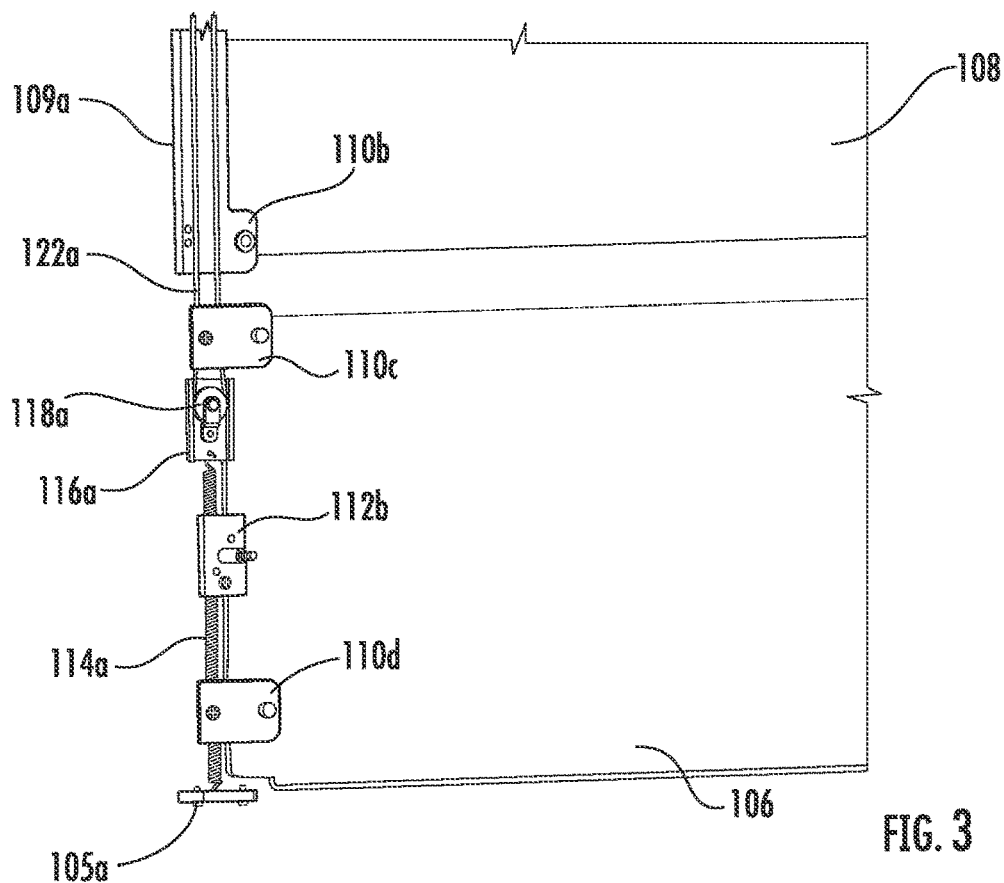
FIG. 3 is a detail view of a front lower portion of the sliding golf cart windshield assembly of FIG. 2.
Figure 4:
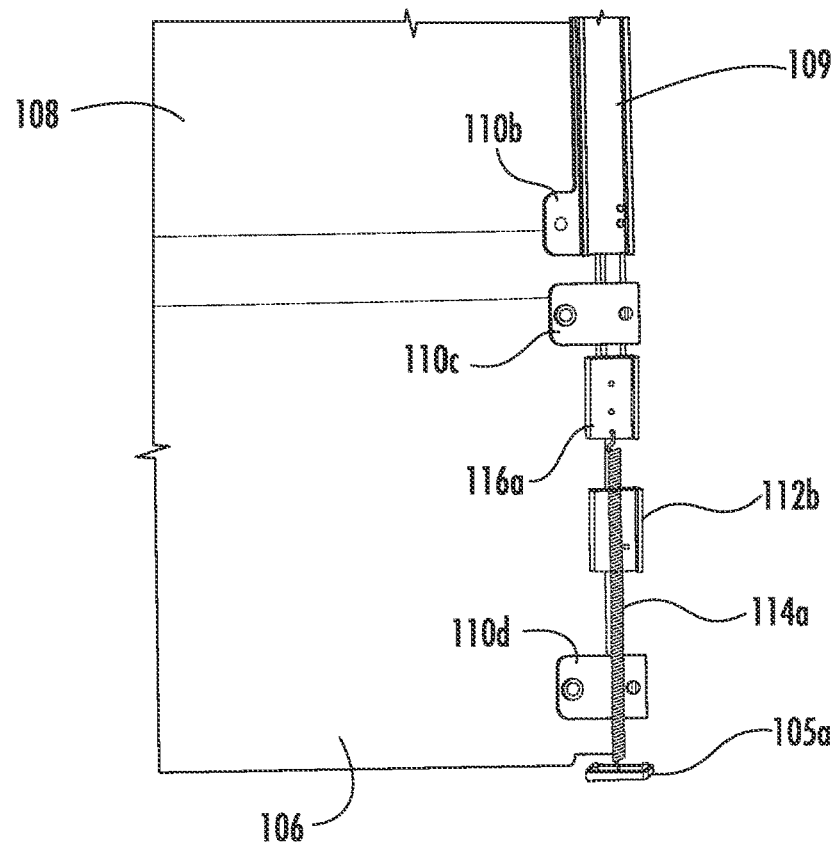
FIG. 4 is a detail view of a rear lower portion of the sliding golf cart windshield assembly of FIG. 2.

The assembly 100 also includes a first belt 122a having a first end 127a and a second end 125a. The first end 127a is fixed to the top end 104a of the first elongated rail 102a, and the second end 125a is fixed to the first upper plate 109a. A first resilient member 114a has a bottom end and a top end, where the bottom end is secured to the bottom end 105a of the first elongated rail 102a as shown in FIG. 3, which is a detail view of a front lower portion of the sliding golf cart windshield assembly 100. FIG. 4 is a detail view of a rear lower portion of the sliding golf cart windshield assembly 100.

Still referring to FIGS. 3 and 4, a lower first hub 118a is coupled to the top end of the first resilient member 114a and the first belt 122a passes from the top end 104a of the first elongated member 102a and around the lower first hub 118a to the first upper plate. The lower first hub 118a is carried by a first base 116a.

In addition, the assembly 100 may include a second belt 122b having a first end 127b and a second end 125b similar to the first belt 122a, where the first end 127b is fixed to the top end 104b of the second elongated rail 102b, and the second end 125b is fixed to the second upper plate 109b in similar fashion as the first belt 122a. A second resilient member 114b has a bottom end and a top end, where the bottom end is secured to the bottom end 105b of the second elongated rail 102b. A lower second hub 118b is coupled to the top end of the second resilient member 114b and the second belt 122b passes from the top end 104b of the second elongated member 102b and around the lower second hub 118b to the second upper plate 109b. The lower second hub 118b is carried by a second base 116b.

The first and second resilient members 114a, 114b may be configured to counterbalance the upper windshield pane 108. In addition, a plurality of adjustment clamps 112a, 112b, 112c, 112d may be coupled to the first and second elongated rails 102a, 102b and each be configured to adjust an amount of friction between the upper windshield pane 108 and the first and second elongated rails 102a, 102b when sliding the upper windshield pane 108 up and down.

Figure 5:
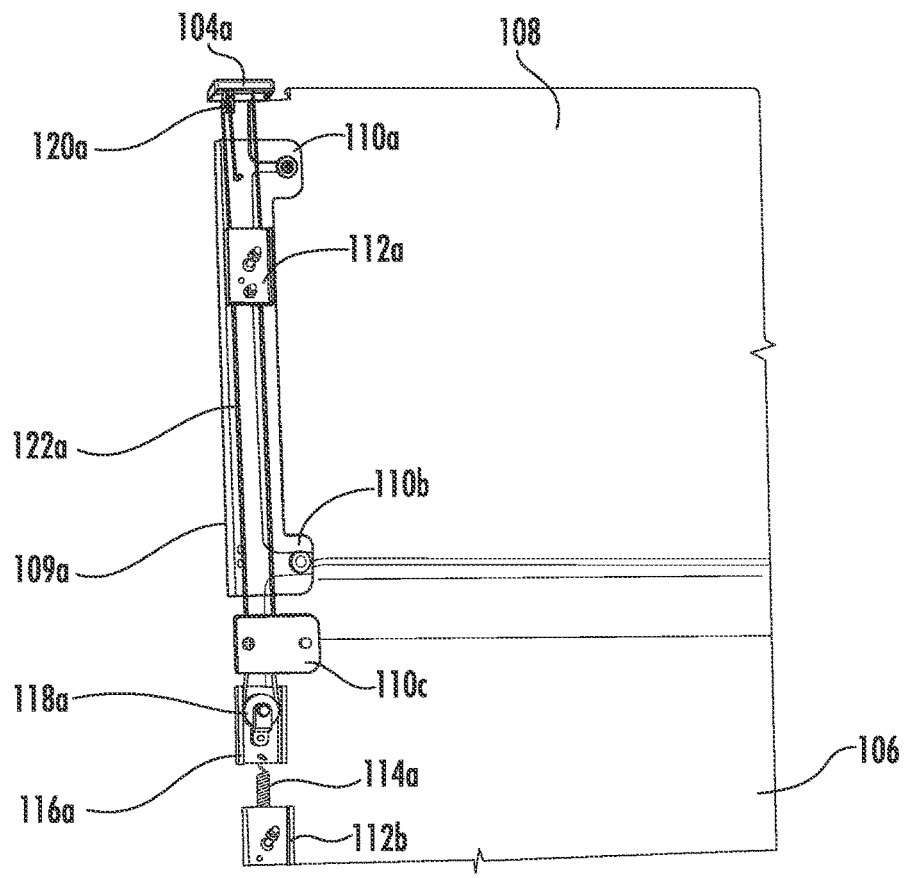
FIG. 5 is a detail view of a front upper portion of the sliding golf cart windshield assembly of FIG. 2.
Figure 6:
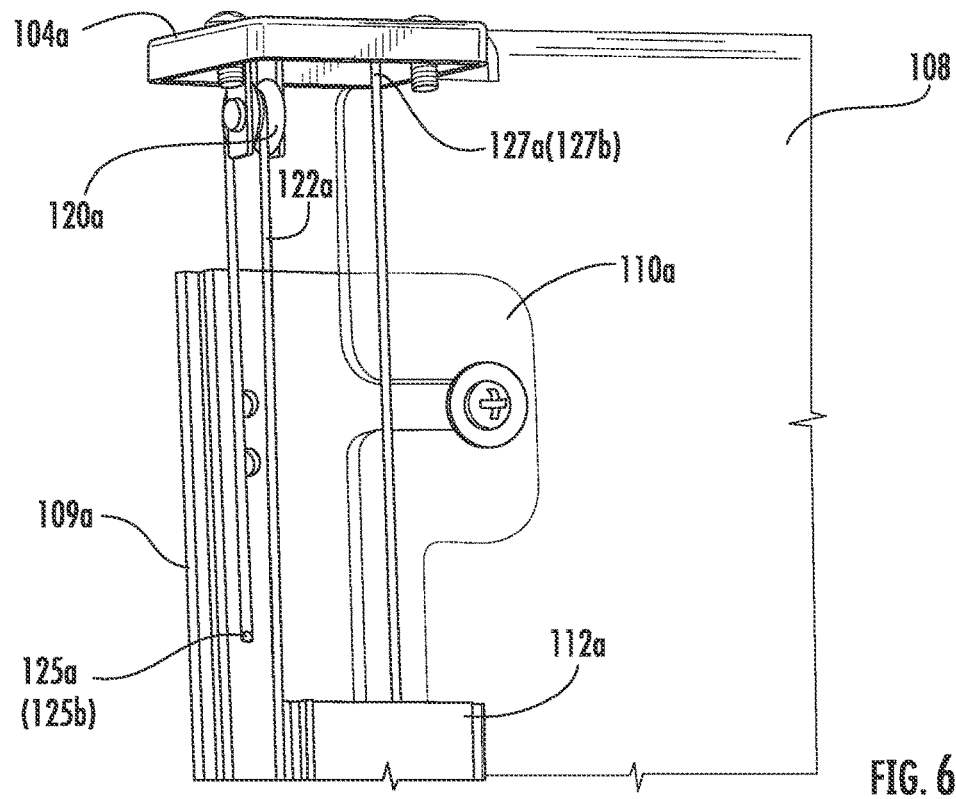
FIG. 6 is a detail view of the front upper portion of the sliding golf cart windshield assembly of FIG. 5.
Figure 7:
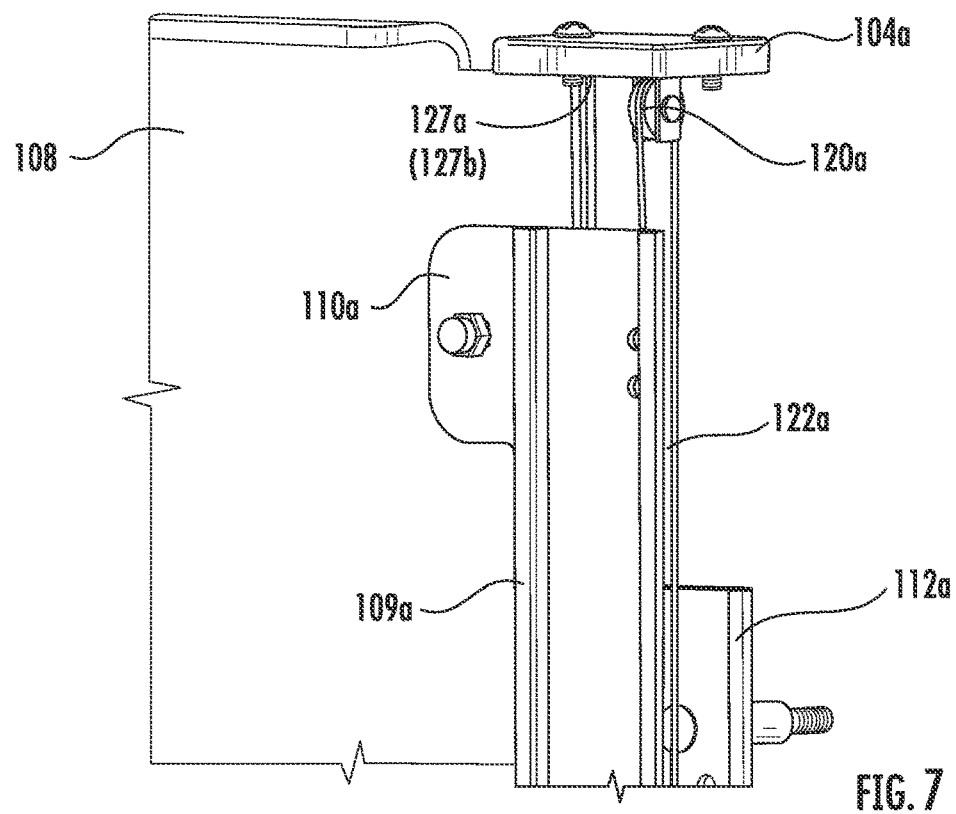
FIG. 7 is a detail view of a rear upper portion of the sliding golf cart windshield assembly of FIG. 5.

The assembly 100 may also include a first upper hub 120a as shown in FIG. 5, which is a detail view of a front upper portion of the sliding golf cart windshield assembly 100. The first upper hub 120 is coupled to the top end 104a of the first elongated rail 102a, where the first belt 122a passes around the first upper hub 120a as best shown in FIGS. 6 and 7. The first end 127a of the first belt 122a is also shown fixed to the top end 104. A second upper hub 120b (see FIG. 2) may be coupled to the top end 104b of the second elongated rail 102b, where the second belt 122b passes around the second upper hub 120b similar to the first upper hub 120a.

The first and second belts 122a, 122b may comprise flexible cords and the first and second lower hubs 120a, 120*b* may each comprise a pulley. In addition, the first and second resilient members 114*a*, 114*b* may comprise springs.

Figure 8:
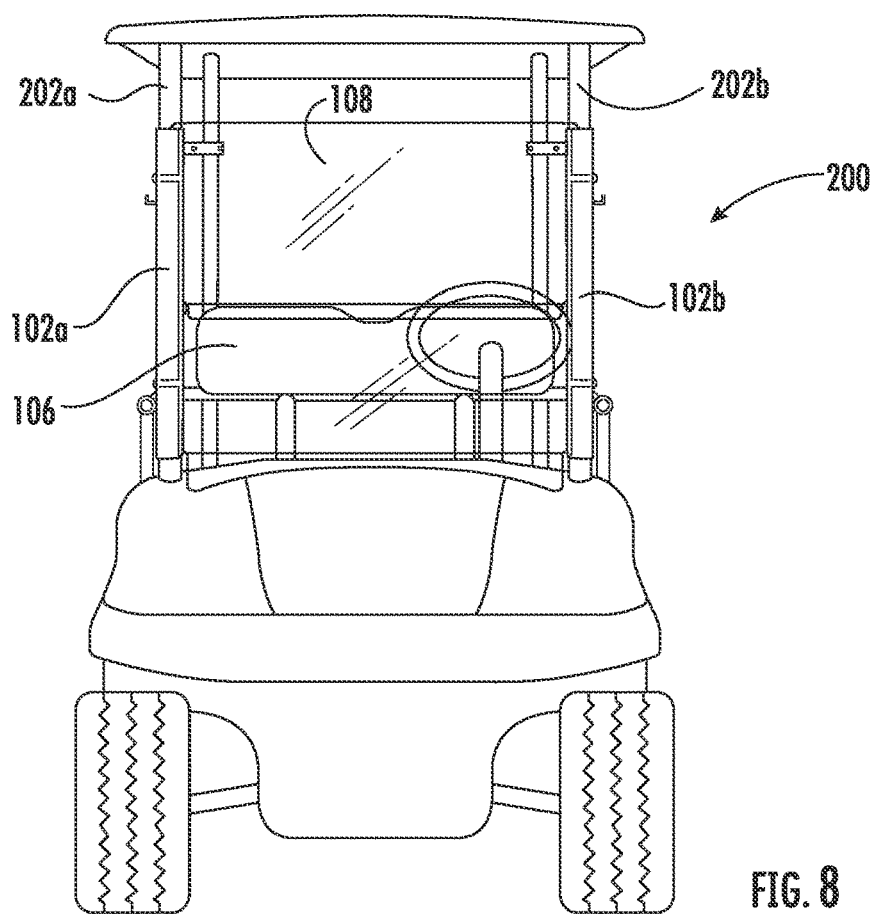
FIG. 8 is a front view of the sliding golf cart windshield assembly installed on a golf cart.

As described above, the assembly 100 may be configured to be secured to vertical support members 202*a*, 202*b* of a golf cart 200 as shown in FIG. 8. Clamps 112*a*, 112*b*, 112*c*, 112*d* may be used to secure the windshield assembly 100 to the golf cart 140.

The elongated rails 102*a*, 102*b* may generally be square or any other shape. The windshield panes 106, 108 are easily replaceable if damaged because they require no glue in contrast to prior art windshield assemblies.

A lower edge of the upper windshield pane 108 overlaps the lower windshield pane 106 when the upper windshield pane 108 is in the uppermost vertical position. This provides a complete barrier that protects the driver and passenger of the golf cart 200 from the weather such as wind and rain, for example. Existing typical golf cart windshields include two panes that are hinged together, which does not provide full protection from the elements through the gap between the panes in addition to not being vertically adjustable.

The clamps 112*a*, 112*b*, 112*c*, 112*d* may be used to removably secure the windshield assembly 100 to the golf cart 200. The clamps 112*a*, 112*b*, 112*c*, 112*d* may have a square, round or other shaped interior surface to fit around the vertical support members 202*a*, 202*b*. The clamps 114 may slip over the vertical support members 112*a*, 112*b*, 112*c*, 112*d* and then can be adjusted to clamp the windshield assembly 100 firmly in place, or can be bolted directly to the vertical support members 202*a*, 202*b*.

The upper windshield pane 108 is held in the desired vertical position, in part, by using the resilient members 114*a*, 114*b* that function to counterbalance the weight of the upper windshield pane 108. In addition, the clamps 112*a*, 112*b*, 112*c*, 112*d*, may be adjusted to increase the friction resistance of the first and second plates 109*a*, 109*b* sliding inside the first and second elongated rails 102*a*, 102*b*. The more friction requires more force by the user to raise and lower the upper windshield pane 108. The desired amount of adjustment will allow the user to comfortable lower and raise the upper windshield pane 108 while at the same time the upper windshield pane 108 is held in the desired position without the use of latches so that it has nearly infinite adjustment.

Referring now to FIG. 9, a front view of a sliding golf cart windshield assembly 300 having a motor 312 in accordance with another particular aspect of the invention is illustrated. The windshield assembly 300 is similar to the windshield assembly 100 described above except that the upper windshield pane 108 can be raised and lowered automatically using the motor 312. The upper windshield pane 108 is coupled to a reciprocating device that is used to raise and lower the upper windshield pane 108. In a particular aspect, the reciprocating device comprises a drive belt 308 that is driven by the motor 312. As those of ordinary skill in the art can appreciate, the reciprocating device may be an air piston, a crank mechanism coupled to a piston, or any device that can mechanically raise and lower the upper windshield pane 108 and is not limited by the example described herein.

The motor 312 is located proximate a bottom end 305 of the rail 302. The motor 312 is coupled to a lower drive pulley 310 and configured to rotate the drive pulley 310. The drive belt 308 is stretched between the lower drive pulley 310 and an upper drive pulley 306 positioned proximate a top end 304 of the rail 302. Accordingly, as the motor 312 rotates the lower drive pulley 310, this in turn causes the drive belt 308 to also begin to move over the upper and lower drive pulleys 306, 310. As one side of the drive belt 308 moves upwards, the opposing side of the drive belt moves downwards.

A drive panel 311 is slidingly engaged with the rail 302 and is secured proximate an edge of the upper window pane 108 as illustrated in FIG. 9. The drive panel 311 is also secured to one side of the drive belt 308 so that when the one side of the drive belt 308 moves upwards, the upper window pane 108 also moves up. Similarly, when the one side of the drive belt moves downwards, the upper window pane 108 moves down.

In order to keep the drive belt 308 from slipping as the lower drive pulley 310 and upper drive pulley 306 rotate, the drive belt 308 includes a plurality of drive belt teeth 314 as illustrated in FIG. 10. The plurality of drive belt teeth 314 are configured to engage drive pulley teeth 322 as illustrated in FIG. 11. The lower drive pulley 306 includes an inner side 316 that has a locking screw 317. The shaft 315 of the motor 312 slides into center aperture 319 of the lower drive pulley 306 and is secured by tightening the locking screw 317. An outer face 319 of the lower drive pulley 306 is configured to keep the drive belt 308 aligned on a middle portion 320 of the lower drive pulley 306 having the drive belt teeth 322.

Figure 12:
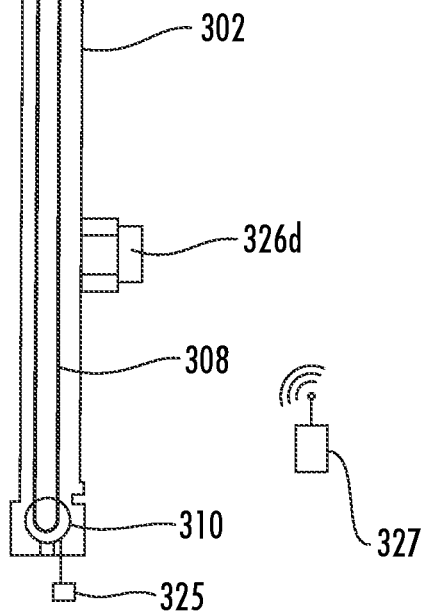
FIG. 12 is an elevational view of the drive belt and upper and lower drive pulleys taken in the direction of line 12-12 of FIG. 9.

Referring now to FIG. 12, an elevational view taken in the direction of line 12-12 of FIG. 9 illustrates the position of the drive belt 308 and upper and lower drive pulleys 306, 310 within the rail 302. The drive panel 311 that is secured to the drive belt 308 has been removed for clarity. The electric motor 312 can be voice activated or activated using an electric switch 325 or by wireless remote 327 as those of ordinary skill in the art can appreciate. Brackets 324*c* and 326*d* are used to secure the rail 302 to the vertical supports 202*a*, 202*b* of the golf cart 200 discussed above.

Figure 13:
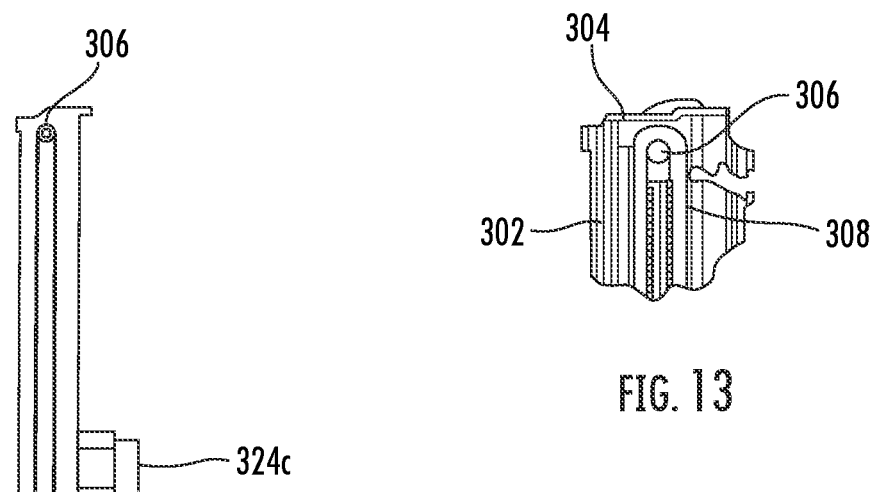
FIG. 13 is a detail view of the upper drive pully and drive belt of FIG. 12.
Figure 14:
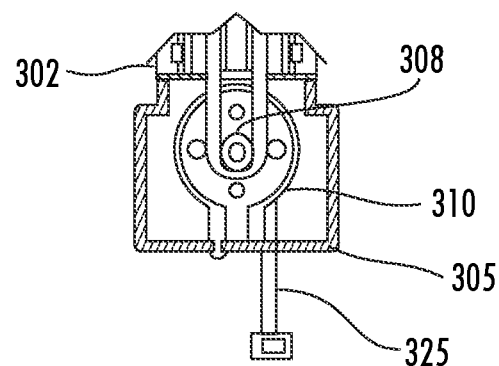
FIG. 14 is a detail view of the lower drive pully and drive belt of FIG. 12.

FIG. 13 is a detail view of the upper drive pulley 306 and the drive belt 308. The upper drive pulley 306 is positioned proximate the top end 304 of the rail 302. FIG. 14 is a detail view of the lower drive pulley 310 and drive belt 308 positioned proximate the bottom end 305 of the rail 302. As those of ordinary skill in the art can appreciate, the motor 312 could be coupled to the upper drive pulley 306 rather than the lower drive pulley 310.

Figure 15:
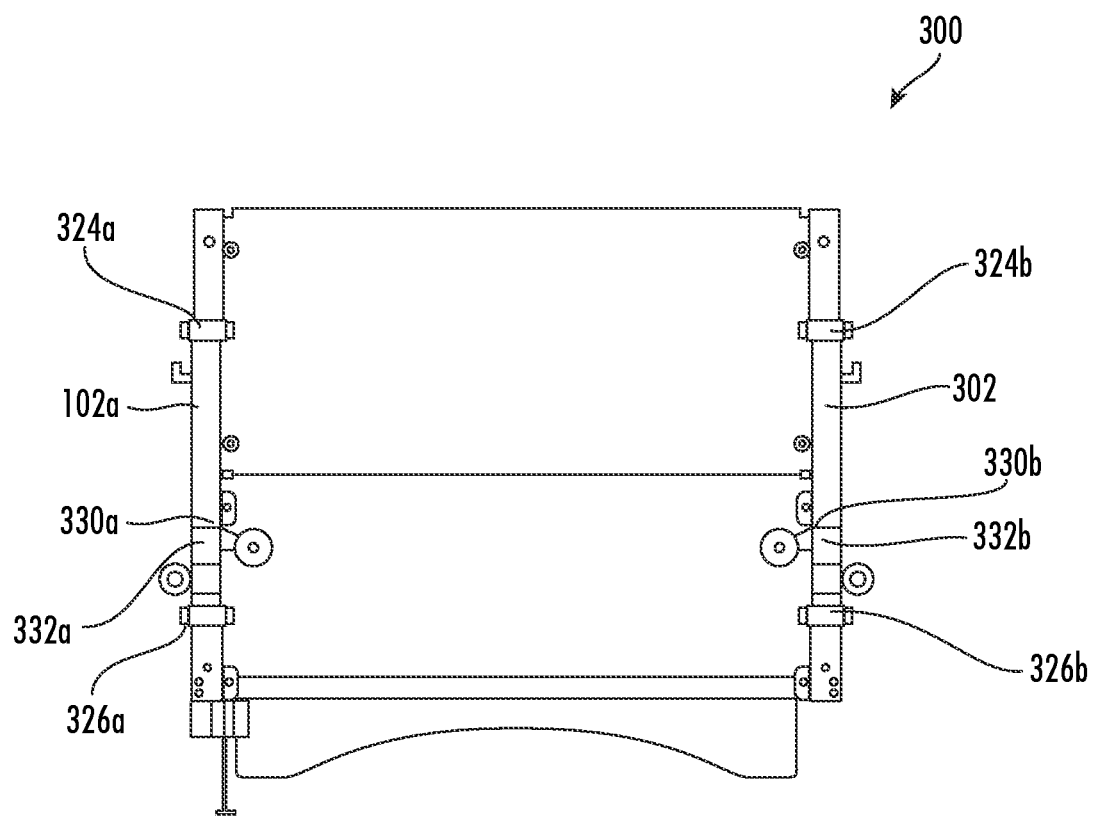
FIG. 15 is a rear view of the sliding golf cart windshield assembly having a pair of speakers mounted to opposing sides thereof.
Figure 16:
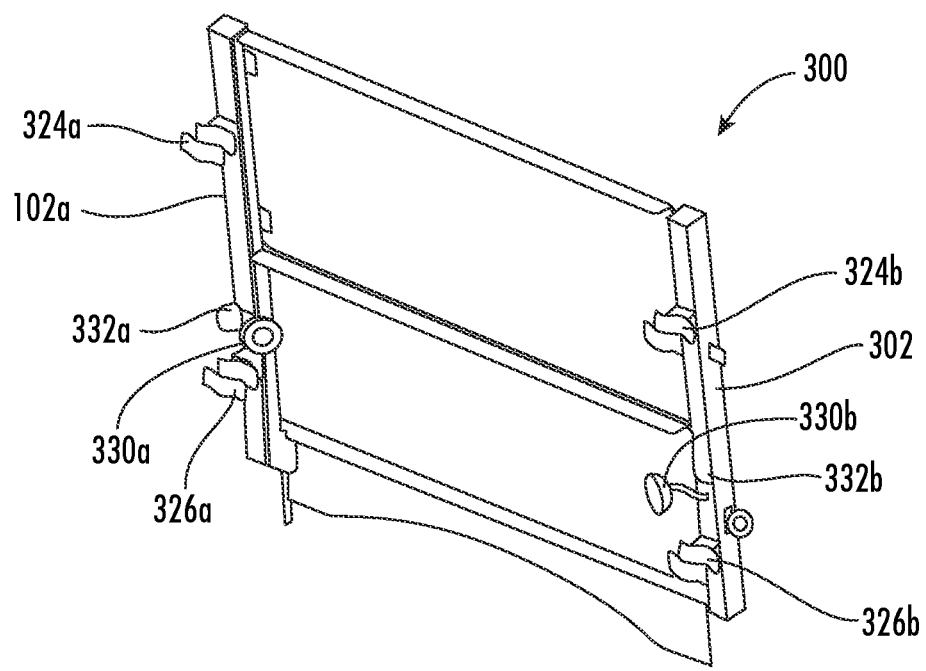
FIG. 16 is a rear perspective view of the sliding golf cart windshield assembly and the pair of speakers of FIG. 15.

Referring now to FIGS. 15 and 16, a pair of speakers 330*a*, 330*b* are mounted to opposing rails 102*a*, 302*a* of the sliding golf cart windshield assembly 300 (or 100). The speakers 330*a*, 330*b* may be wired or wirelessly controlled and connected to a music source. The speaker 330*a* is mounted to the rail 102 using a bracket 332*a* that extends from the rail 102*a* inwards. Similarly, speaker 330*b* is mounted to rail 302 using a bracket 332*b* that also extends from the rail 302 inwards. The windshield assembly 300 is secured to the vertical supports 202*a*, 202*b* using brackets 324*a*, 326*a* and 324*b*, 324*c*, which allow for universal mounting in the even the vertical supports 202*a*, 202*b* are not parallel and for mounting on different width of golf carts.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A sliding golf cart windshield assembly, the assembly comprising:

a first elongated rail having a top end and a bottom end;

a second elongated rail spaced apart from the first elongated rail and having a top end and a bottom end;

an upper windshield pane having a first longitudinal edge and an opposing second longitudinal edge, the upper windshield pane positioned between the first and second elongated rails;

an upper windshield plate secured to the first longitudinal edge of the upper windshield pane and being slidable within the first elongated rail;

a lower hub coupled to the bottom end of the first elongated rail;

an upper hub coupled to the top end of the first elongated rail;

a belt having a first end and a second end, the first end fixed to the top end of the first elongated rail and the belt passes around the lower hub back to the upper hub with the second end of the belt being fixed to the upper windshield plate, wherein the belt is configured to support the upper windshield pane;

a lower drive pulley positioned proximate the bottom end of the second rail;

an upper pulley positioned proximate the top end of the second rail;

a drive belt riding between the lower drive pulley and the upper pulley;

a drive panel slidingly engaged with the second rail and secured to the upper windshield pane and the drive belt; and a motor coupled to the lower drive pulley and configured to rotate the lower drive pulley to raise and lower the upper windshield pane.

2. The sliding golf cart windshield assembly of claim 1, further comprising a resilient member having a bottom end and a top end, the bottom end secured to the bottom end of the first elongated rail and the top end secured to the lower hub.

3. The sliding golf cart windshield assembly of claim 2, wherein the resilient member is configured to counterbalance the upper windshield pane.

4. The sliding golf cart windshield assembly of claim 1, further comprising a lower windshield pane fixed between the first and second elongated rails.

5. The sliding golf cart windshield assembly of claim 1, wherein the drive belt includes a plurality of drive belt teeth.

6. The sliding golf cart windshield assembly of claim 5, wherein the lower drive pulley comprises a plurality of drive pulley teeth configured to engage the plurality of drive belt teeth.

7. The sliding golf cart windshield assembly of claim 1, further comprising at least one speaker.

8. The sliding golf cart windshield of claim 7, wherein the at least one speaker is wirelessly connected to a music source.

9. The sliding golf cart windshield assembly of claim 1, wherein the assembly is configured to be secured to vertical support members of a golf cart.

10. The sliding golf cart windshield assembly of claim 1, wherein the drive belt comprises a flexible material.

\* \* \* \* \*